June 19, 1934.   A. T. SMITH   1,963,476

COFFEE EXTRACTOR

Filed April 15, 1932

INVENTOR.
Alva T. Smith
BY
Morsell & Morsell
ATTORNEYS.

Patented June 19, 1934

1,963,476

UNITED STATES PATENT OFFICE 1,963,476

COFFEE EXTRACTOR

Alva T. Smith, Milwaukee, Wis.

Application April 15, 1932, Serial No. 605,414

2 Claims. (Cl. 210—67)

This invention relates to improvements in coffee extractors.

In the preparation of coffee, it is an established fact that boiling water releases objectionable oils and acids from the coffee particles. With prior methods, however, in order to satisfactorily extract the aromatic oils which are necessary in producing an appetizing beverage, boiling water must be used, and necessarily the objectionable constituents appear in the final product.

It is one of the objects of the present invention to provide an improved coffee extractor which is designed to function in accordance with the present day understanding of scientific preparation of the beverage, the extractor being capable of releasing the more soluble aromatic oils in an extremely short period of time by the use of water which has not reached the boiling point. This is brought about by the novel type of apparatus which is designed to direct the water through the coffee particles with such force that the desirable oils are effectively extracted with water which is at a temperature sufficiently below the boiling point to prevent the extraction of the objectionable oils and acids.

A further object of the invention is to provide an improved coffee extractor in which centrifugal force is utilized in an effective manner.

A more specific object of the invention is to provide a coffee extractor consisting of a rotatably mounted vessel having openings formed in a peripheral portion thereof and shaped to hold centrifugally thrown coffee particles adjacent said openings, the openings being so shaped as to eliminate the possibility of their becoming clogged, and so as to eliminate the loss of coffee particles while permitting centrifugally thrown water to seep through to an outer container after it has extracted the aromatic oils.

A further object of the invention is to provide a coffee extractor embodying a vessel having discharge openings as above described, in which said openings are in the form of elongated, relatively narrow slots.

A further object of the invention is to provide a coffee extractor having a rotatable vessel which is shaped so as to provide for a maximum amount of contact between the coffee particles and the water to render the process thoroughly efficient and economical.

A further object of the invention is to provide a coffee extractor which may be marketed either in the form of an attachment for use in the place of a citrus fruit extractor on a standard electric mixer, or which may be produced in unitary form with a self-contained motor and outer receptacle.

A further object of the invention is to provide a coffee extractor having a rotatable vessel, in which said vessel is of sectional form to facilitate the cleaning thereof.

A further object of the invention is to provide a coffee extractor in which the rotatable vessel is constructed with a guard surrounding the inlet opening to prevent the premature escape of liquid.

A further object of the invention is to provide a coffee extractor which is simple in construction, inexpensive, and well adapted for the purpose described.

With the above and other objects in view, the invention consists of the improved coffee extractor and all its parts and combinations as set forth in the claims, and all equivalents thereof.

In the accompanying drawing illustrating one complete embodiment of the preferred form of the invention, in which the same reference numerals designate the same parts in all of the views.

Figure 1:
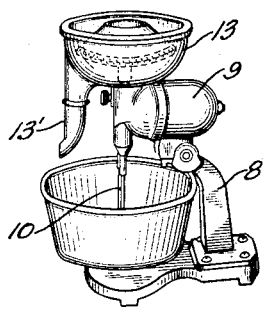
Fig. 1 is a perspective view of a standard form of electric mixer showing the improved extractor as used in connection therewith.

Referring to the drawing, a standard form of combination food mixer and juice extractor is indicated generally by the numeral 8. This type of device is provided, among other things, with an electric motor contained in the housing 9 arranged to drive a depending mixer 10, and simultaneously therewith a stud 11, which projects from the upper portion of the device through a suitable packing nut 12 into the interior of a container 13. The said container is of standard form, and is provided with a discharge spout 13'.

This type of mixer is usually provided with a reamer which is adapted to be fitted on the stud 11, and which is arranged to extract juices from oranges, lemons and the like. The present invention relates to a special attachment which may be operably connected with the stud 11, and which is arranged to effectively produce coffee.

The improved device consists of a vessel 14 which is constructed with a lower part 15 and with an upper part 16, the said upper part being held removably in position by spring clips 17. The lower section has its bottom inclined upwardly, as at 18, to an inverted cup-shaped center 19. A sleeve 20 depends from the center of the cup-shaped bottom 19, and is provided with slots 21 which are adapted to engage pins 22 of the rotatable stud 11 to operatively connect the extractor with the mixer.

The lower section 15 of the extractor unit is also formed with an upturned peripheral edge 23 having elongated, relatively narrow slots 24 therein.

The upper section 16 of the extractor is in the form of a truncated cone, and has its bottom curved, as at 25, to conform to the curvature 23 of the peripheral edge of the lower section. The periphery of the upper section 16 is also formed with elongated, relatively narrow slots 27 which are preferably maintained in an offset position from the slots of the lower section. A plurality of spacing lugs 28 depend from the lower edge of the upper section and engage the peripheral edge of the lower section to space the said sections apart a slight distance. There is thus formed a circumferential slot 29 which is of approximately the same width as the transverse slots 24 and 27.

The upper part of the section 16 is formed with a central inlet opening 30 which is surrounded by a depending flange 31.

Figure 2:
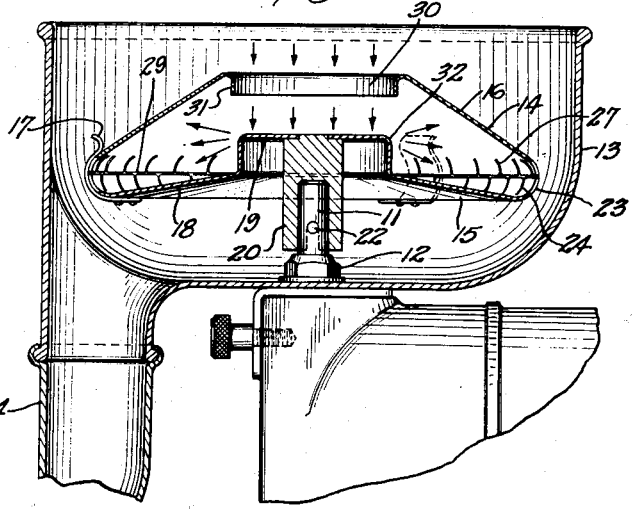
Fig. 2 is a fragmentary view of the device showing the coffee extractor portion in vertical section.
Figure 6:
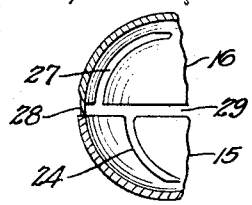
Fig. 6 is a sectional view taken on line 6—6 of Fig. 5.
Figure 3:
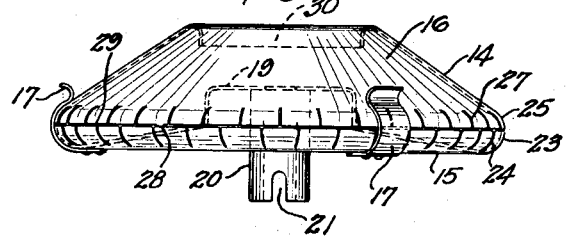
Fig. 3 is a side elevational view of the extractor unit alone.
Figure 5:
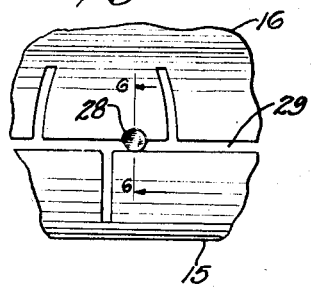
Fig. 5 is an enlarged detail view showing a portion of the extractor unit in elevation to illustrate the sectional construction.
Figure 4:
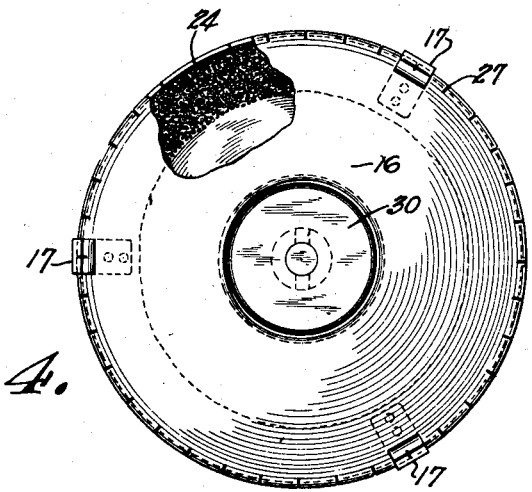
Fig. 4 is a plan view of the extractor unit, part being broken away.

In use, the extractor unit is placed in position on a mixer, as shown in Figs. 1 and 2, and the motor of the mixer is set in operation to cause rotation of the extractor unit. Next, the ground coffee particles are thrown into the inlet opening 30 of the rotating vessel, and said particles are thrown by centrifugal force to a position in which they cover the slots 24, 27 and 29, as shown in Fig. 4. Next, water which has preferably been heated to a temperature of approximately 190° Fahrenheit, is poured into the inlet opening 30. The said water, as indicated by the arrows in Fig. 2, will strike the top of the inverted cup-shaped part 19 of the lower section, and will then be thrown off of the peripheral edge 32 thereof in the directions indicated by the arrows. The water will, therefore, be projected with great violence directly toward the coffee particles and the centrifugal force will cause the water to seep through the coffee toward the slotted openings. Due to the even distribution of the coffee particles around the inner periphery of the vessel, and due to the even distribution of the water toward said particles, a most effective contact between the water and coffee is insured. When the water has seeped entirely through the coffee particles, it will pass through the slotted openings and into the outer container 13, from which it is discharged by the spout 13' into a coffee pot or other portable receptacle.

Due to the use of relatively narrow slots instead of round perforations, the openings in the vessel will not become clogged by the coffee particles, and the said particles will be effectively prevented from seeping through into the outer vessel.

As before pointed out, it is not necessary to use water which has reached the boiling point, in view of the fact that the peculiar shape of the extractor unit and the centrifugal force cooperate to cause effective extraction of the desirable oils when the water is at a temperature below the boiling point. Furthermore, the novel shape and the centrifugal action make it possible to produce coffee with a minimum amount of coffee particles. This is due to the thorough extraction of the beneficial oils from all of the coffee particles used.

In view of the fact that the liquid within the rotating vessel has a tendency to creep up the sides thereof, the depending flange 31 is utilized around the inlet opening. This effectively prevents premature loss of liquid.

If it is desired to clean the extractor, this can be quickly accomplished by separating the sections 15 and 16 from one another as when this is done, access to all parts of the interior of the vessel is permitted.

Although the invention has been shown more particularly as an attachment for a standard food mixer and juice extractor, it is to be understood that it can be manufactured in the form of a unit with a self-contained motor and outer receptacle. It is further to be understood that various other changes and modifications may be made without departing from the spirit of the invention, and all of such changes are contemplated as may come within the scope of the claims.

What I claim is:

1. A coffee extractor comprising a rotatable receptacle having a peripheral portion thereof formed with apertures and having upper and lower wall portions which converge toward said peripheral portion to direct centrifugally thrown material toward the apertures, said receptacle being formed of two complementary sections which are separable on a line extending around the apertured peripheral portion, and yielding means cooperable with the shape of the container for releasably holding the sections together.

2. A coffee extractor comprising a rotatable receptacle having an upper inlet opening, said receptacle having upper and lower wall portions which converge to form a peripheral portion of limited depth to cause centrifugally thrown coffee to be concentrated adjacent said peripheral portion of limited depth, said portion of the receptacle being formed with apertures to compel centrifugally thrown water to pass through the coffee before escaping through said apertures, the bottom of the receptacle being formed with an upstanding part which is in substantial alignment with the inlet opening for aiding the beforementioned direction of the material toward peripheral portion of limited depth when the material is thrown by centrifugal force.

ALVA T. SMITH.